(12) United States Patent
Varney

(10) Patent No.: US 11,248,491 B2
(45) Date of Patent: Feb. 15, 2022

(54) ADDITIVELY DEPOSITED GAS TURBINE ENGINE COOLING COMPONENT

(71) Applicant: Rolls-Royce Corporation, Indianapolis, IN (US)

(72) Inventor: Bruce Edward Varney, Greenwood, IN (US)

(73) Assignee: ROLLS-ROYCE CORPORATION, Indianapolis, IN (US)

(*) Notice: Subject to any disclaimer, the term of this patent is extended or adjusted under 35 U.S.C. 154(b) by 103 days.

(21) Appl. No.: 16/729,041

(22) Filed: Dec. 27, 2019

(65) Prior Publication Data
US 2020/0131931 A1 Apr. 30, 2020

Related U.S. Application Data

(62) Division of application No. 15/264,098, filed on Sep. 13, 2016, now abandoned.

(51) Int. Cl.
F01D 25/12 (2006.01)
F01D 5/18 (2006.01)
(Continued)

(52) U.S. Cl.
CPC ............. F01D 25/12 (2013.01); B23P 15/04 (2013.01); F01D 5/182 (2013.01); F01D 5/186 (2013.01);
(Continued)

(58) Field of Classification Search
CPC .. F01D 25/12; F01D 5/182–186; F23R 3/002; F05D 2260/201–203; F05D 2230/31–314
See application file for complete search history.

(56) References Cited

U.S. PATENT DOCUMENTS 3,706,203 A 12/1972 Goldberg et al.
3,806,276 A 4/1974 Aspinwall
(Continued)

FOREIGN PATENT DOCUMENTS

CN 105091030 A 11/2015
DE 102006005364 A1 8/2007
(Continued)

OTHER PUBLICATIONS

Search Report from counterpart European Application No. 17186119.8, dated Mar. 8, 2018, 9 pp.
(Continued)

*Primary Examiner* — Woody A Lee, Jr.
*Assistant Examiner* — Brian O Peters
(74) *Attorney, Agent, or Firm* — Shumaker & Sieffert, P.A.

(57) ABSTRACT

An example gas turbine engine component includes a component configured to separate a cooling air plenum from a heated gas environment. The component includes a substrate defining a surface, and a unitary structure. The unitary structure includes a cooling region and a cover layer. The cover layer defines a hot wall surface configured to face the heated gas environment. The cooling region is disposed between the cover surface and the substrate and includes a plurality of support structures extending between the cover layer and the surface of the substrate. At least some of the support structures define a respective bond surface bonded to the substrate at the surface of the substrate. An example technique for fabricating the gas turbine engine component includes additively depositing the unitary structure on the surface of the substrate.

19 Claims, 6 Drawing Sheets

(51) Int. Cl.
*F01D 9/04* (2006.01)
*F23R 3/00* (2006.01)
*F23R 3/06* (2006.01)
*B23P 15/04* (2006.01)

(52) U.S. Cl.
CPC .............. *F01D 9/041* (2013.01); *F23R 3/002* (2013.01); *F23R 3/005* (2013.01); *F23R 3/06* (2013.01); *F05D 2220/32* (2013.01); *F05D 2230/20* (2013.01); *F05D 2230/31* (2013.01); *F05D 2240/12* (2013.01); *F05D 2240/30* (2013.01); *F05D 2240/35* (2013.01); *F05D 2260/201* (2013.01); *F05D 2260/202* (2013.01); *F05D 2260/203* (2013.01); *F05D 2260/94* (2013.01)

(56) References Cited

U.S. PATENT DOCUMENTS

| | | | |
|---|---|---|---|
| 4,695,247 | A | 9/1987 | Enzaki et al. |
| 5,017,753 | A | 5/1991 | Deckard |
| 5,381,944 | A | 1/1995 | Makowiecki et al. |
| 5,474,227 | A | 12/1995 | Krengel et al. |
| 5,902,498 | A | 5/1999 | Mistry et al. |
| 6,172,327 | B1 | 1/2001 | Aleshin et al. |
| 6,199,746 | B1 | 3/2001 | Dupree et al. |
| 6,491,208 | B2 | 12/2002 | James et al. |
| 6,575,702 | B2 | 6/2003 | Jackson et al. |
| 6,602,053 | B2 | 8/2003 | Subramanian et al. |
| 6,797,914 | B2 | 9/2004 | Speranza et al. |
| 6,837,417 | B2 | 1/2005 | Srinivasan |
| 6,929,446 | B2 * | 8/2005 | Lu ............................ F01D 5/186 415/115 |
| 7,051,435 | B1 | 5/2006 | Subramanian et al. |
| 7,146,725 | B2 | 12/2006 | Kottilingam et al. |
| 7,484,928 | B2 | 2/2009 | Arness et al. |
| 7,761,989 | B2 | 7/2010 | Lutz et al. |
| 7,966,707 | B2 | 6/2011 | Szela et al. |
| 7,975,902 | B2 | 7/2011 | Wilden et al. |
| 8,087,565 | B2 | 1/2012 | Kottilingam et al. |
| 8,247,733 | B2 | 8/2012 | Zhu |
| 8,356,409 | B2 | 1/2013 | Perret |
| 8,539,659 | B2 | 9/2013 | Szela et al. |
| 8,555,500 | B2 | 10/2013 | Vossberg et al. |
| 8,800,298 | B2 | 8/2014 | Ladd et al. |
| 8,875,392 | B2 | 11/2014 | Richter |
| 10,550,701 | B2 * | 2/2020 | Kiener ..................... F01D 5/187 |
| 2003/0026697 | A1 | 2/2003 | Subramanian et al. |
| 2004/0086635 | A1 | 5/2004 | Grossklaus, Jr. et al. |
| 2005/0217110 | A1 | 10/2005 | Topal |
| 2007/0003416 | A1 * | 1/2007 | Bewlay ................ B23K 35/327 416/241 B |
| 2007/0044306 | A1 | 3/2007 | Szela et al. |
| 2007/0163684 | A1 | 7/2007 | Hu |
| 2008/0011813 | A1 | 1/2008 | Bucci et al. |
| 2008/0173386 | A1 * | 7/2008 | Clark ...................... F01D 5/005 156/73.1 |
| 2009/0026182 | A1 | 1/2009 | Hu et al. |
| 2009/0255116 | A1 | 10/2009 | McMasters et al. |
| 2010/0176097 | A1 | 7/2010 | Zhu et al. |
| 2010/0257733 | A1 | 10/2010 | Guo et al. |
| 2010/0284798 | A1 | 11/2010 | Campbell et al. |
| 2011/0185739 | A1 | 8/2011 | Bronson et al. |
| 2012/0222306 | A1 | 9/2012 | Mittendorf et al. |
| 2014/0003948 | A1 | 1/2014 | Dubs et al. |
| 2014/0169943 | A1 | 6/2014 | Bunker et al. |
| 2014/0242400 | A1 | 8/2014 | Hoebel et al. |
| 2014/0259666 | A1 | 9/2014 | Baughman et al. |
| 2014/0302278 | A1 | 10/2014 | Bunker |
| 2016/0032766 | A1 | 2/2016 | Bunker et al. |
| 2018/0073390 | A1 | 3/2018 | Varney |

FOREIGN PATENT DOCUMENTS

| | | | |
|---|---|---|---|
| EP | 1503144 | A1 | 2/2005 |
| EP | 1528322 | A2 | 5/2005 |
| EP | 1803521 | A1 | 7/2007 |
| EP | 1880793 | A2 | 1/2008 |
| EP | 1884306 | A1 | 2/2008 |
| EP | 2206575 | A1 | 7/2010 |
| EP | 2578720 | A2 | 4/2013 |
| GB | 2107225 | * | 4/1983 |
| WO | 2012092279 | A1 | 7/2012 |
| WO | 2015147929 | A2 | 10/2015 |

OTHER PUBLICATIONS

Response to Search Report dated Mar. 8, 2018, from counterpart European Application No. 17186119.8, filed Oct. 3, 2018, 47 pp.
Prosecution History from U.S. Appl. No. 15/264,098, dated Feb. 6, 2019 through Dec. 6, 2019, 61 pp.

* cited by examiner

ADDITIVELY DEPOSITED GAS TURBINE ENGINE COOLING COMPONENT

This application is a divisional of U.S. application Ser. No. 15/264,098, filed Sep. 13, 2016, which is incorporated herein by reference in its entirety.

TECHNICAL FIELD

The present disclosure relates to forming a cooled component in a gas turbine engine.

BACKGROUND

Hot section components of a gas turbine engine may be operated in high temperature environments that may approach or exceed the softening or melting points of the materials of the components. Such components may include air foils including, for example turbine blades or vanes which may have one or more surfaces exposed high temperature combustion or exhaust gases flowing across the surface of the competent. Different techniques have been developed to assist with cooling of such components including, for example, application of a thermal barrier coating to the component, construction the component as single or dual wall structure, and passing a cooling fluid, such as air, across or through a portion of the component to aid in cooling of the component. Maintaining the efficiency and operation of such cooling systems is useful to facilitate engine performance and prevent over heating of the engine.

SUMMARY

In some examples, the disclosure describes an example gas turbine engine component configured to separate a cooling air plenum from a heated gas environment. The gas turbine engine component includes a substrate defining a surface, and a unitary structure. The unitary structure includes a cooling region and a cover layer. The cover layer defines a hot wall surface configured to face the heated gas environment. The cooling region is disposed between the cover surface and the substrate. The cooling region includes a plurality of support structures extending between the cover layer and the surface of the substrate. At least some of the support structures define a respective bond surface bonded to the substrate at the surface of the substrate.

In some examples, the disclosure describes an example technique for fabricating a gas turbine engine component. The technique includes additively depositing a unitary structure on a surface of a substrate. The unitary structure includes a cooling region and a cover layer. The cover layer defines a hot wall surface configured to face the heated gas environment. The cooling region is disposed between the cover layer and the substrate and includes a plurality of support structures extending between the cover layer and the surface of the substrate. At least some of the support structures define respective bond surface bonded to the substrate at the surface.

The details of one or more examples are set forth in the accompanying drawings and the description below. Other features, objects, and advantages will be apparent from the description and drawings, and from the claims.

DETAILED DESCRIPTION

Figure 1:
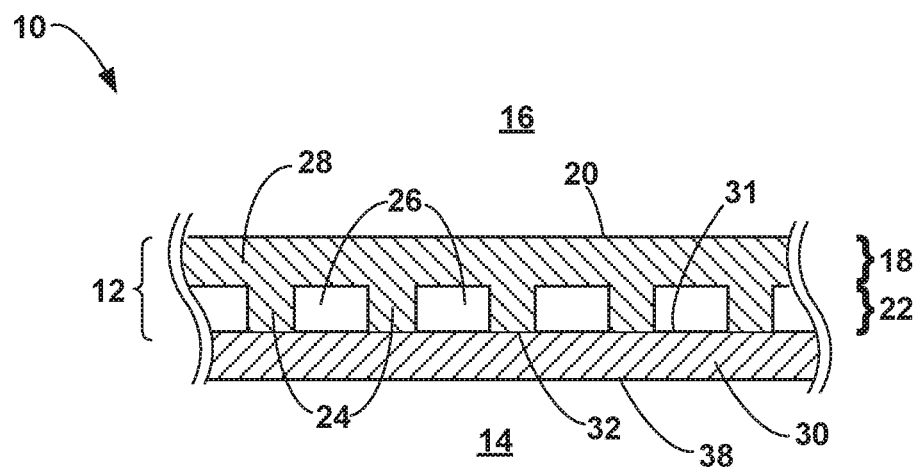
FIG. 1 is a conceptual cross-sectional view of an example component for a gas turbine engine that includes a unitary structure bonded to a surface of a substrate.

The disclosure generally describes gas turbine engine components configured to separate a cooling air plenum from a heated gas environment, in which the gas turbine engine component includes a substrate defining a surface and a unitary structure comprising a cooling region and a cover layer. The cover layer may define a hot wall surface configured to face the heated gas environment. The cooling region may be disposed between the cover layer and the substrate and includes a plurality of support structures extending between the cover layer and the surface of the substrate. At least some of the support structures define a respective bond surface bonded to the substrate at the surface of the substrate. The surface of the substrate may include a two-dimensional collection of points (flat surface), a three-dimensional collection of points whose cross section is a curve (curved surface), the boundary of any three-dimensional solid, or a continuous boundary dividing a three-dimensional space into two regions. By disposing the bond between the unitary structure and the substrate at the interface between the support structures and the substrate, the gas turbine engine components may possess an increased working life and better mechanical stability compared to components in which the bond interface is between the cover layer and the support structures. While not wishing to be bound by any specific theory, it is believed that this is due to the bond interface potentially introducing thermal resistivity. By moving the bond interface further from the hot wall surface, more of the unitary structure is exposed to cooling air, which may lead to increased heat transfer from the unitary structure to the cooling air.

Hot section components, such as turbine surfaces, air foils, and flame tubes of a combustor of a gas turbine engine may be operated in high temperature gaseous environments. In some examples, the temperature of the gaseous environments may approach or exceed the melting point or softening point of a material from which at least a portion of the component is formed. For example, operating temperatures in a high pressure turbine section of a gas turbine engine may exceed melting or softening points of superalloy materials used in the high pressure turbine section, e.g., to form substrates of blades or vanes.

In some examples, to reduce or substantially prevent melting or softening of the engine components, the components may include a dual wall structure having a hot wall (e.g., coversheet), a cold wall (e.g., substrate), and a cooling region between the hot wall and the cold wall. The cooling region may include support structures between the hot wall and the cold wall. In some examples, the cooling system may function by flowing relatively cold air from the compressor section of the gas turbine engine through cooling channels in the cooling region of the dual wall structure. These cooling channels may exhaust some or all of the cooling air through cooling apertures in the surface of the hot wall. In some examples, the cooling air may help protect the component in such high temperature gaseous environments by, for example, reducing the relative temperature of the component, creating an insulating film of cooling air passing over the surface of the component exposed to the high temperature environment, or reducing the temperature of the gas within the high temperature environment. Dual wall structures may also reduce cooling airflow needs compared to a single wall structure, so that a greater volume of the airflow is available for operation of the turbine, for example, for combustion.

Support structures may include features such as pins, fins, pedestals, or the like between the hot wall and the cold wall in the dual wall structure. In some examples, the support structures also function as cooling features, the dual wall structure may include additional cooling features (such as cooling channel) between the hot wall and the cold wall, or both. Such cooling features may improve the effectiveness of cooling, for example, by providing additional surface area for convective cooling, by increasing conduction area to draw heat away from the hot wall, by routing cooling air through the space between the hot wall and cold wall in selected flow patterns, or the like. In some examples, the effectiveness of the cooling features may increase as the cooling features are made finer due to an increase in exposed surface area to volume of the cooling features.

While techniques such as integral casting, diffusion bonding, and machining may be used to fabricate dual wall structures, these techniques have drawbacks. For example, integral casting with ceramic cores may utilize ceramic cores with very fine features, which are difficult to reliably and repeatably form, may have low manufacturing yields, may have limitations on feature size, and may present difficulties in inspecting support structures and cooling features between the hot wall and the cold wall to check for defects, blockages, or other failures. Using refractory metal cores may present similar difficulties in inspecting the support structures and cooling features to check for defects, blockages, or other failures.

Diffusion bonding of separate spars and coversheets may present higher costs and increased complexity because of additional machining of castings prior to diffusion bonding and the use of multiple castings. Additionally, in some examples, bonding cycles may lead to some loss in material capability. While DMLS (direct metal laser sintering) may be used to fabricate separate cover sheets on spars having cooling features, the resulting components may have reduced material properties compared to single crystal alloys used in hot section components, for example, because of geometric discontinuities or compositional differences between separately fabricated cover sheets and spars, and may exhibit potential blockage of cooling circuits if filler material used to define voids or other channels is not fully removed after DMLS is complete. Aligning cooling holes in the hot wall with the underlying cooling pattern also may be difficult when fabricating the hot wall separately from the cold wall then joining the hot wall and cold wall.

In some examples according to the disclosure, dual wall components may be formed by additively depositing a unitary structure on a substrate. The unitary structure may include the hot wall, the support structures, and, optionally, one or more separate cooling features. The disclosed examples and techniques described herein may be used to manufacture dual wall structures with, in various examples, intricate or fine cooling features, having higher yields compared to integral casting, having lower costs than diffusion bonded constructions, and/or providing better alignment between cooling holes in the hot wall and support structures or cooling features. Example dual wall components according to the disclosure may have a bond line between the cold wall and the hot wall that is farther from the hot wall compared to dual wall components manufactured using other techniques, which may lead to an increased working life and better mechanical stability.

FIG. 1 is a conceptual cross-sectional view of an example component 10 for a gas turbine engine. Component 10 includes a unitary structure 12, and is configured to separate a cooling air plenum 14 from a heated gas environment 16 such that component 10 acts as a physical separation between the two environments.

In some examples, component 10 may include a hot section component for a gas turbine engine that receives or transfers cooling air as part of cooling system for a gas turbine engine. Component 10 may include, for example, components of a combustor such as a flame tube, combustion ring, the inner or outer casing, liner, guide vanes, or the like; components of a turbine section such as a nozzle guide vane, a turbine disc, a turbine blade, or the like; or another component associated with the air-cooling system of a gas turbine engine. In some examples, component 10 may be constructed with a ceramic matrix composite, a superalloy substrate, or other materials used, for example, in the aviation or aerospace industry. However, component 10 may be formed of suitable materials other than those mentioned above.

Cooling air plenum 14 and heated gas environment 16 may represent different flow paths, chambers, or regions within the gas turbine engine in which component 10 is installed. For example, in some examples in which component 10 is a flame tube of a combustor of a gas turbine engine, heated gas environment 16 may comprise the combustion chamber within the flame tube and cooling air plenum 14 may be the by-pass/cooling air flow path that surrounds the exterior of the flame tube. In some examples in which component 10 is a turbine blade or vane, heated gas environment 16 may represent the environment exterior to and flowing past the turbine blade or vane while cooling air plenum 14 may include one or more interior chambers within the turbine blade or vane representing part of the integral cooling system of the gas turbine engine.

Unitary structure 12 includes a cover layer 18 and a cooling region 22. Unitary structure 12 is constructed of a composition 28 that may include any suitable material discussed above with reference to the construction of component 10 that may be deposited using additive manufacturing. In some examples, composition 28 may include a superalloy, for example a nickel-based superalloy.

Unitary structure 12 may be disposed on and attached to a major surface 31 of a substrate 30 of component 10. Cooling region 22 of unitary structure 12 may be disposed between cover layer 18 and substrate 30 such that cover layer 18 faces heated gas environment 16 and substrate 30 faces cooling air plenum 14. As such, in some examples, substrate 30 may be referred to as a cold wall and cover layer 18 may be referred to as a hot wall. In some examples, one or both of cover layer 18 and substrate 30 may define a thickness between about 0.014 inches and about 0.300 inches (e.g., about 0.36 mm to about 7.62 mm). In some examples, cooling region 22 may have a thickness between about 0.25 mm and about 7 mm.

Cover layer 18 defines a hot wall surface 20 configured to face heated gas environment 16. Substrate 30 defines a cold wall surface 38 configured to face cooling air plenum 14. The terms "cold wall surface" and "hot wall surface" are used merely to orient which wall is adjacent to cooling air plenum 14 and which wall is adjacent to heated gas environment 16, respectively, and are not intended to limit the relative temperatures of the different environments or wall. For example, while cold wall surface 38 and cooling air plenum 14 may be described as "cold" sections compared to hot wall surface 20 and heated gas environment 16, the respective temperatures of cold wall surface 38 or cooling air plenum 14 may reach temperatures between about 390° F. to about 1830° F. (e.g., about 200° C. to about 1000° C.) during routine operation.

Cooling region 22 may include a plurality of support structures 24. The plurality of support structures 24 may define a network of the plurality of cooling channels 26. For example, the plurality of support structures 24 may include one or more of pedestals, columns, spires, raised features, or channel walls. The plurality of support structures 24 also may function as cooling features, e.g., for conducting heat from cover layer 18 toward substrate 30. In some examples, cooling region 22 may include one or more additional cooling features, such as the plurality of cooling channels 26. The plurality of support structures 24 and, optionally, other cooling features, may take on any useful configuration, size, shape, or pattern. In some such examples, the height of plurality of support structures 24 may be between about 0.25 mm and about 7 mm to define the thickness of cooling region 22.

In some examples, the plurality of support structures 24 may include a corrugated structure that defines the plurality of cooling channels 26 between the respective walls of the corrugated structure. In some examples, the plurality of support structures 24 may also include one or more dams that act as zone dividers within the cooling region 22 thereby separating one cooling channel of the plurality of cooling channels 26 from another cooling channel of the plurality of cooling channels 26. The introduction of dams within cooling region 22 may assist with maintaining a more uniform temperature along hot wall surface 20 by controlling flow of cooling air within the plurality of cooling channels 26. Thus, in some examples, the plurality of support structures 24 provides a conduit for heat transfer across hot wall surface 20 of cover layer 18 and cooling region 22 between cooling air plenum 14 and heated gas environment 16, as part of the air-cooling system for a gas turbine engine.

Unitary structure 12 is bonded to substrate 30, for example, at bond surface 32 defined by cooling region 22, e.g., at respective bases of the plurality of support structures 24 opposite of cover layer 18. As seen in FIG. 1, bond surface 32 is between cooling region 22 and substrate 30, such that bond surface 32 is on the opposite side of cooling region 22 from cover layer 18.

The efficiency of heat transferred from heated gas environment 16 to cooling air plenum 14 across cooling region 22 may depend on a variety of factors including, but not limited to, the thermal conductivity of composition 28 of unitary structure 12, the total area of hot wall surface 20 of cover layer 18, the surface area defined by plurality of support structures 24 and plurality of cooling channels 26, the thermal conductivity of substrate 30, the total area of cold wall surface 38, the thermal conductivity at bond surface 32, and the size of cooling channels of the plurality of cooling channels 26. For example, the thermal conductivity at bond surface 32 may be different (e.g., less) from the respective thermal conductivity of one or both of unitary structure 12 and substrate 30. In some examples, bond surface 32 may act as a thermal resistor that inhibits the transfer of heat across bond surface 32, because of a lower thermal conductivity at bond surface 32, or because of local variations in composition or geometry. In examples where bond surface 32 has a lower thermal conductivity or acts as a thermal resistor, positioning bond surface 32 closer to hot wall surface 20, for example between cover layer 18 and cooling region 22, may impede the transfer of heat from cover layer 18 to the plurality of cooling channels 26 compared to when bond surface 32 is positioned further from hot wall surface 20, for example between cooling region 22 and substrate 30. The net consequence of such a configuration may result in less heat being transferred to cooling air 32. In contrast, positioning bond surface 32 farther away from hot wall surface 20, for example, between cooling region 22 and substrate 30 may improve the efficiency of heat transfer. Therefore, positioning bond surface 32 between cooling region 22 and substrate 30 may result in more heat being transferred from hot wall surface 20 across cooling region 22.

Figure 2:
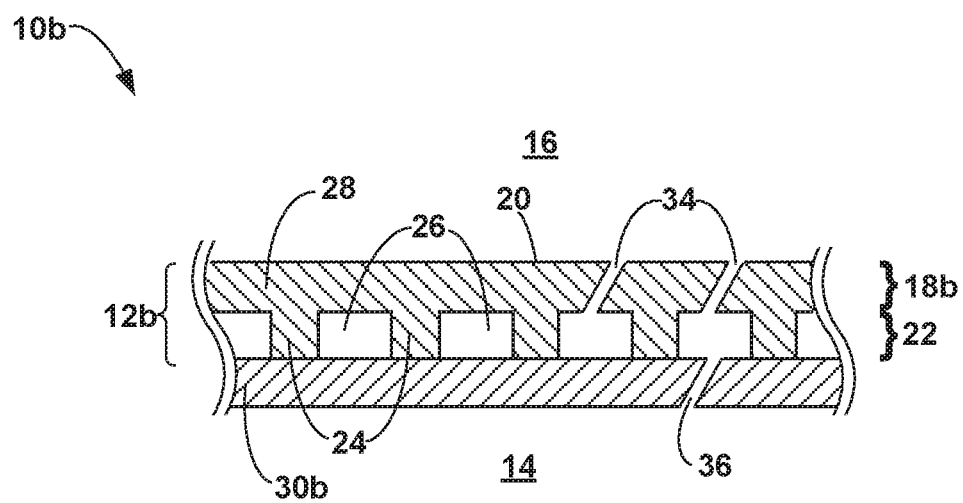
FIG. 2 is conceptual cross-sectional view of an example component for a gas turbine engine that includes a unitary structure bonded to a surface of a substrate, where a cover layer of the unitary structure defines cooling apertures.

In some examples, cover layer 18 may define a plurality of cooling apertures 34, as shown in FIG. 2. FIG. 2 is conceptual cross-sectional view of an example component 10b for a gas turbine engine that includes a unitary structure 12b adjacent a substrate 30b. Unitary structure 12b may be substantially similar to unitary structure 12 discussed with reference to FIG. 1 above, while including a cover layer 18b substantially similar to cover layer 18 of FIG. 1.

Unlike cover layer 18 of FIG. 1, cover layer 18b defines the plurality of cooling apertures 34. Cooling apertures 34 may extend between cooling region 22 and hot wall surface 20. In some examples, substrate 30b may be substantially similar to substrate 30 discussed with reference to FIG. 1 above. However, unlike substrate 30 of FIG. 1, substrate 30b may define a plurality of impingement apertures 36 extending between cooling region 22 and cold wall surface 38. In some examples, the diameter of one or both of plurality of cooling apertures 34 and impingement apertures 36 may be between about 0.01 inches and about 0.12 inches (e.g., about 0.25 mm to about 3 mm). Thus, in some examples, article 10b may be substantially similar to article 10 discussed above with reference to FIG. 1, while further including one or both of plurality of cooling apertures 34 or plurality of impingement apertures 36.

During operation of either component 10 or component 10b, the temperature of the air within cooling air plenum 14 may be less than that of the hot gas environment 16. During operation of component 10b, cooling air may pass from cooling air plenum 14 to heated gas environment 16 through one or both of the plurality of cooling apertures 34 or the plurality of impingement apertures 36. The cooling air may assist in maintaining the temperature of component 10b at a level lower than that of heated gas environment 16. For example, the cooling air may enter heated gas environment 16 creating an insulating film of relatively cool gas along hot wall surface 20 of component 10b that allows hot wall surface 20 of component 10b to remain at a temperature less than that of the bulk temperature of heated gas environment 16. In some examples, the cooling air may also at least partially mix with the gas of heated gas environment 16, thereby reducing the relative temperature of heated gas environment 16. In some examples, the cooling region 22 may create a zoned temperature gradient between the respective regions of cooling air plenum 14 and heated gas environment 16. Additionally, or alternatively, the cooling gas may act as a cooling reservoir that absorbs heat from component 10b as the gas passes through cooling apertures 24 or along one or more of the surfaces of component 10b, thereby dissipating the heat of component 10b and allowing the relative temperature of component to be maintained at a temperature less than that of heated gas environment 16.

In some examples, the cooling air may be supplied to component 10b (e.g., via cooling air plenum 14) at a pressure greater than the gas path pressure within heated gas environment 16. The pressure differential between cooling air plenum 12 and heated gas environment 16 may force cooling air 18 through the plurality of cooling apertures 34. In some examples, the plurality of cooling apertures 34 may include film cooling holes that are shaped to reduce the use of cooling air. The plurality of cooling apertures 34 may be positioned in any suitable configuration and position about the surface of component 10b. For example, the plurality of cooling apertures 34 may be positioned along the leading edge of a gas turbine blade or vane. In some examples, the plurality of cooling apertures 34 may define incidence angle less than 90 degrees, i.e., non-perpendicular, to the hot wall surface 20 of component 10a. In some examples the angle of incidence may be between about 10 degrees and about 75 degrees to hot wall surface 34 of component 10. In some such examples, adjusting the angle of incidence of hot wall surface 34 may assist with creating a cooling film of the cooling air along hot wall surface 20. Additionally, or alternatively, one or more of the plurality of cooling apertures 34 may include a fanned Coanda ramp path at the point of exit from hot wall surface 20 to help assist in the distribution or film characteristics of the cooling air as it exits a respective cooling aperture of the plurality of cooling apertures 34.

In some examples, component 10 or component 10b may be a dual wall component (e.g., as illustrated in FIGS. 1 and 2). For example, substrate 30 may include a spar, and cover layer 18 may include a coversheet for the spar.

Unitary structure 12 of component 10, or unitary structure 12b of component 10b may be fabricated using example techniques and example additive manufacturing systems, as described with reference to FIGS. 6 and 7. For example, an additive manufacturing system including a controller, a material stream and an energy beam may be used to fabricate unitary structure 12. The controller may direct the material stream and the energy beam along a tool path based on a digital representation of unitary structure 12.

The energy beam may interact with portions of the material stream, for example, by fusing, solidifying, or sintering material from the material stream at a series of focal regions along the tool path, to deposit volumes of material along the tool path. In some examples, the controller may deposit successive layers of material that ultimately form unitary structure 12. For example, the controller may direct the material stream and the energy beam to deposit material in layers, forming the plurality of support structures 24 defining the plurality of cooling channels 26 in cooling region 22.

In some examples, the controller may direct deposition of material on surface 31 of substrate 30 in a predetermined build direction, for example, a vertical direction pointing away from surface 31. Thus, the controller may direct material along the build direction, beginning with layers of material on or adjacent surface 31 and then continuing to deposit layers that are successively farther away from surface 31. For example, the controller may first direct the material stream and the energy beam to deposit layers of material forming the plurality of support structures 24, and then continue depositing material along the tool path forming layers of material supported by the plurality of supporting structures 24, that eventually form cover layer 18. Thus, additive manufacturing may be used to form cover layer 18 that is integrated, continuous, or otherwise unitary with cooling region 22.

In some examples, before additively depositing material on surface 31 of substrate 30, a filler composition may be deposited in a predetermined pattern. The filler composition may be deposited using extrusion, coating, stamping, masking, templating, or other suitable technique for depositing the filler composition in the predetermined pattern. The filler composition may be in the form of a paste, a liquid, a gel, a solid, or any other form that may support additively deposited material without collapsing. In some examples, a layer of the filler composition of a predetermined thickness may be deposited on surface 31, followed by machining or removal of filler composition from predetermined portions of the layer. The predetermined pattern of filler composition may define the plurality of cooling channels 26, for example, by preventing the deposition of additively deposited material within a volume occupied by the filler composition. For example, the controller may direct the deposition of additive material over the predetermined pattern defined by the filler composition, such that the predetermined pattern of filler composition defines the plurality of cooling channels as layers of additively deposited material are deposited over the predetermined pattern.

The filler composition may include a filler or sacrificial material that may persist through the additive manufacturing, and be removed after the additive manufacturing is complete. For example, the filler composition may be susceptible to at least one of heat, leaching, or oxidation. The filler composition may be removable from the plurality of cooling channels 26, for example, by subjecting the filler composition to at least one of a thermal treatment, leaching composition, or an oxidizing environment. In some examples, the filler composition includes one or more of ceramic, metal, alloys, or other suitable refractory material. Thus, in examples in which filler composition is used, at the end of additive manufacturing, the plurality of cooling channels 26 may be occupied with the filler composition. After the additive manufacturing, part or whole of unitary structure 12 or component 10 may be subjected to one or more of heating, leaching, oxidation, or other suitable treatment for substantially removing the filler composition from unitary structure 12.

Thus, additive manufacturing may be used to fabricate component 10, component 10b, or other example components including unitary structures. For example, in addition to the components described with reference to FIGS. 1 and 2, additive manufacturing may be used to fabricate turbine components described with reference to FIGS. 3-5.

Figure 3:
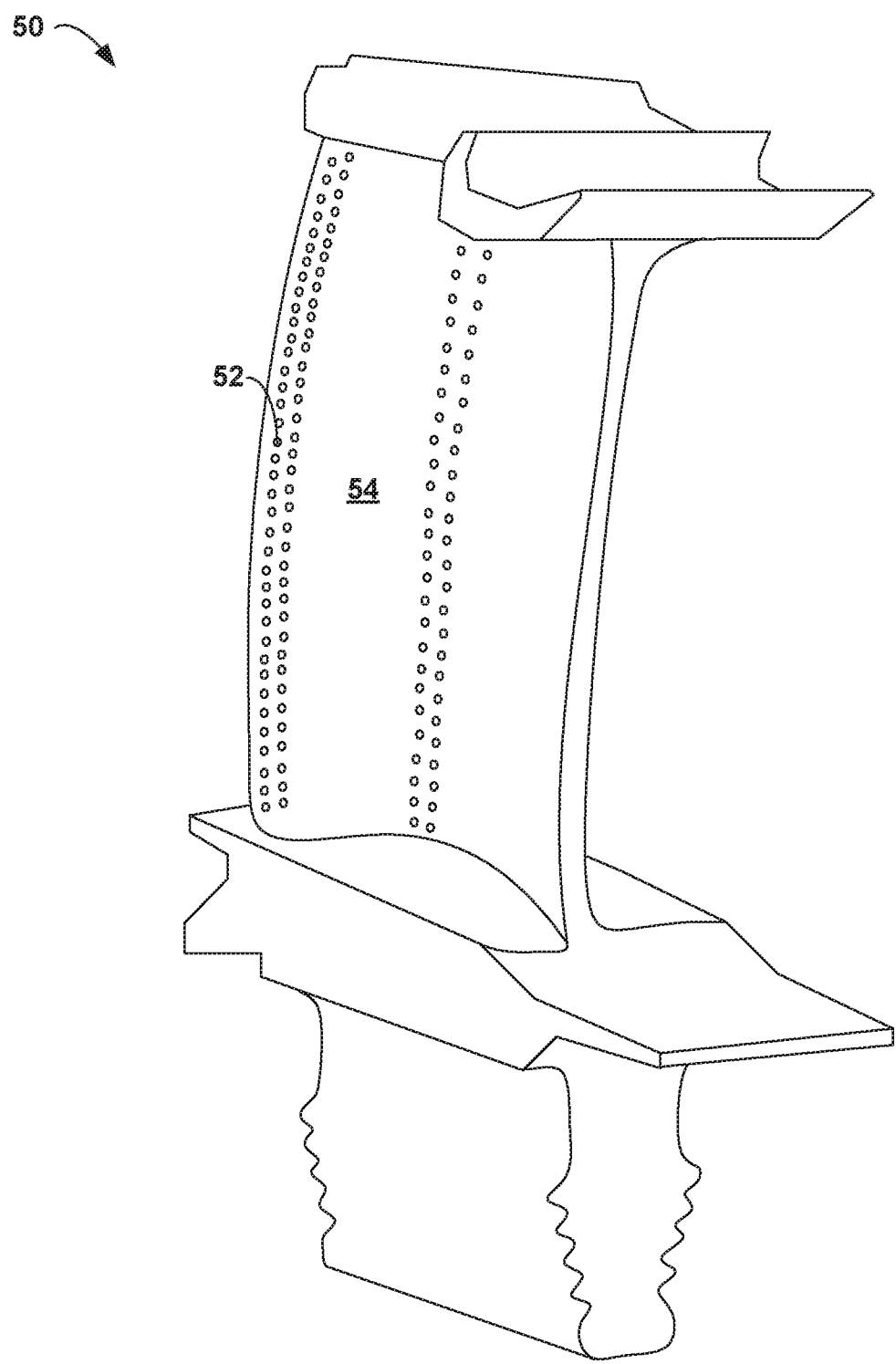
FIG. 3 is a conceptual diagram of an example turbine blade for use in a gas turbine engine.
Figure 4:
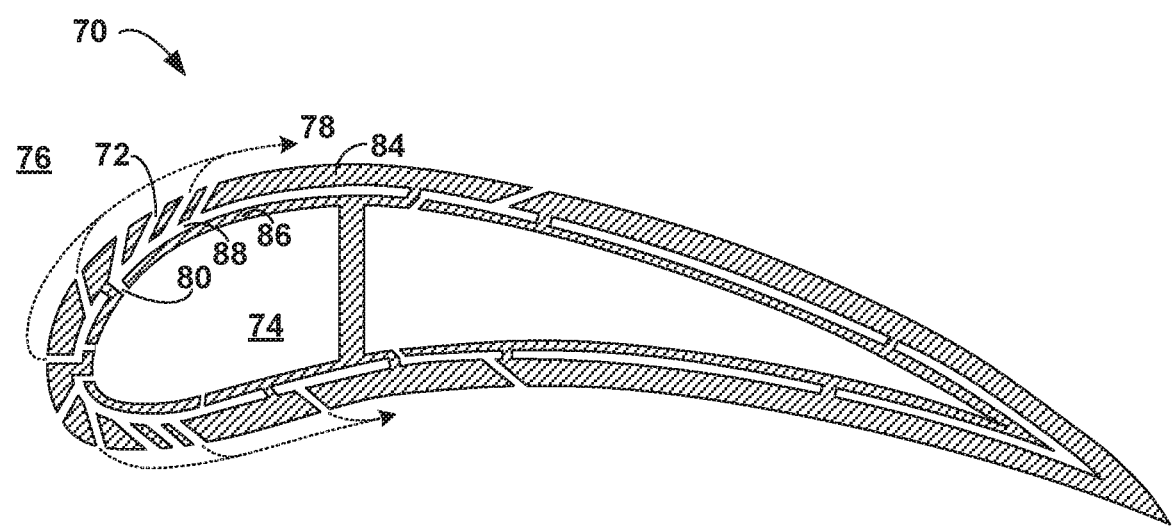
FIG. 4 is a conceptual cross-sectional view of an example dual walled turbine blade for use in a gas turbine engine that includes a unitary structure bonded to a surface of a substrate.

FIG. 3 is a conceptual diagram of an example turbine airfoil component (e.g., turbine blade or vane) for use in a gas turbine engine. FIG. 3 illustrates an example turbine airfoil 50 that includes a plurality of cooling apertures 52 arranged on a hot section wall surface 54 of the airfoil. Turbine airfoil 50 may be a dual or multi-walled structure as described above with respect to FIGS. 1 and 2. For example, FIG. 4 illustrates a cross-sectional view of an example dual wall turbine airfoil 70 that includes a plurality of cooling apertures 72 along a hot section wall 84 and a plurality of impingement apertures 80 along a cold section wall 86. In some examples, dual wall turbine airfoil 70 may have substantially the same structural configuration as component 12, for example, including a cooling region including a plurality of support structures extending between hot section wall 84 and cold section wall 86, with the cooling region and hot section wall 84 forming a unitary structure. As shown, cooling air 78 may flow from cooling air plenum 74 through impingement apertures 80 into cooling channels 88 before exiting through cooling apertures 72 into heated gas environment 76.

Figure 5:
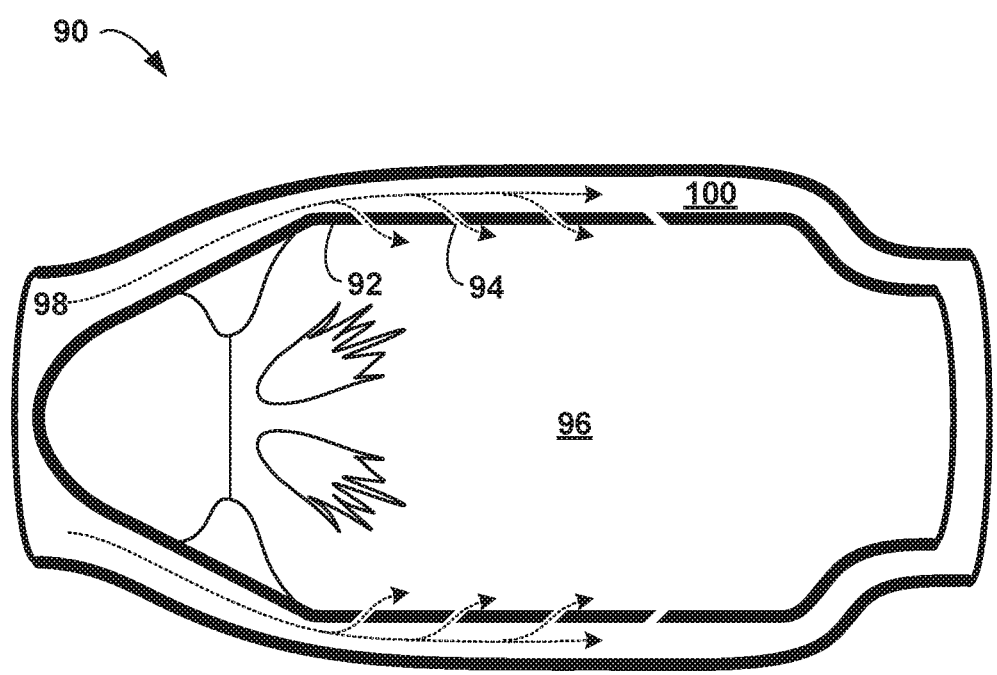
FIG. 5 is a cross-sectional view of an example combustor that includes a flame tube with a sidewall.

FIG. 5 illustrates a cross-sectional view of an example combustor 90 that includes a flame tube 92 (e.g., combustion chamber) with a sidewall defining a plurality of cooling apertures 94. In some examples, the gases within the combustor post combustion, (e.g., heated gas environment 96) may exceed about 1,800° C., which may be too hot for introduction against the vanes and blade of the turbine (e.g., FIGS. 3 and 4). In some examples, the combusted gases may be initially cooled prior to being introduced against the vanes and blade of the turbine by progressively introducing portions of the by-pass air (e.g., cooling air 98) into heated gas environment 96 of flame tube 92 via ingress through plurality of cooling aperture 94 strategically position around flame tube 94, fluidly connecting cooling air 98 within cooling air plenum 100 with heated gas environment 96.

In some examples, combustor 90 includes a dual wall structure having substantially the same structural configuration as component 12, for example, including a cooling region including a plurality of support structures extending between a surface adjacent heated gas environment 96 and a surface adjacent cooling air 98, with the cooling region and the layer adjacent heated gas environment 96 forming a unitary structure. In some example, cooling air 98 may intimately mix with the combusted gases to decease the resultant temperature of the volume of heated gas environment 96. Additionally, or alternatively, cooling air 98 may form an insulating cooling air film along the interior surface (e.g., hot section surface) of flame tube 92. In some examples, the wall of flame tube may include a dual wall (e.g., component 10 or 10b) structure.

Example gas turbine engine components including a unitary structure and a substrate have been described above. As described above, additive manufacturing may be used to fabricate a unitary structure including an integrated or continuous unitary cover layer and cooling region. For example, example components may be fabricated using additive manufacturing, for example, using the example system of FIG. 6, and the example technique of FIG. 7, as discussed below. However, example components described with reference to FIGS. 1-5 above may be fabricated using other suitable example systems or other suitable example techniques.

Figure 6:
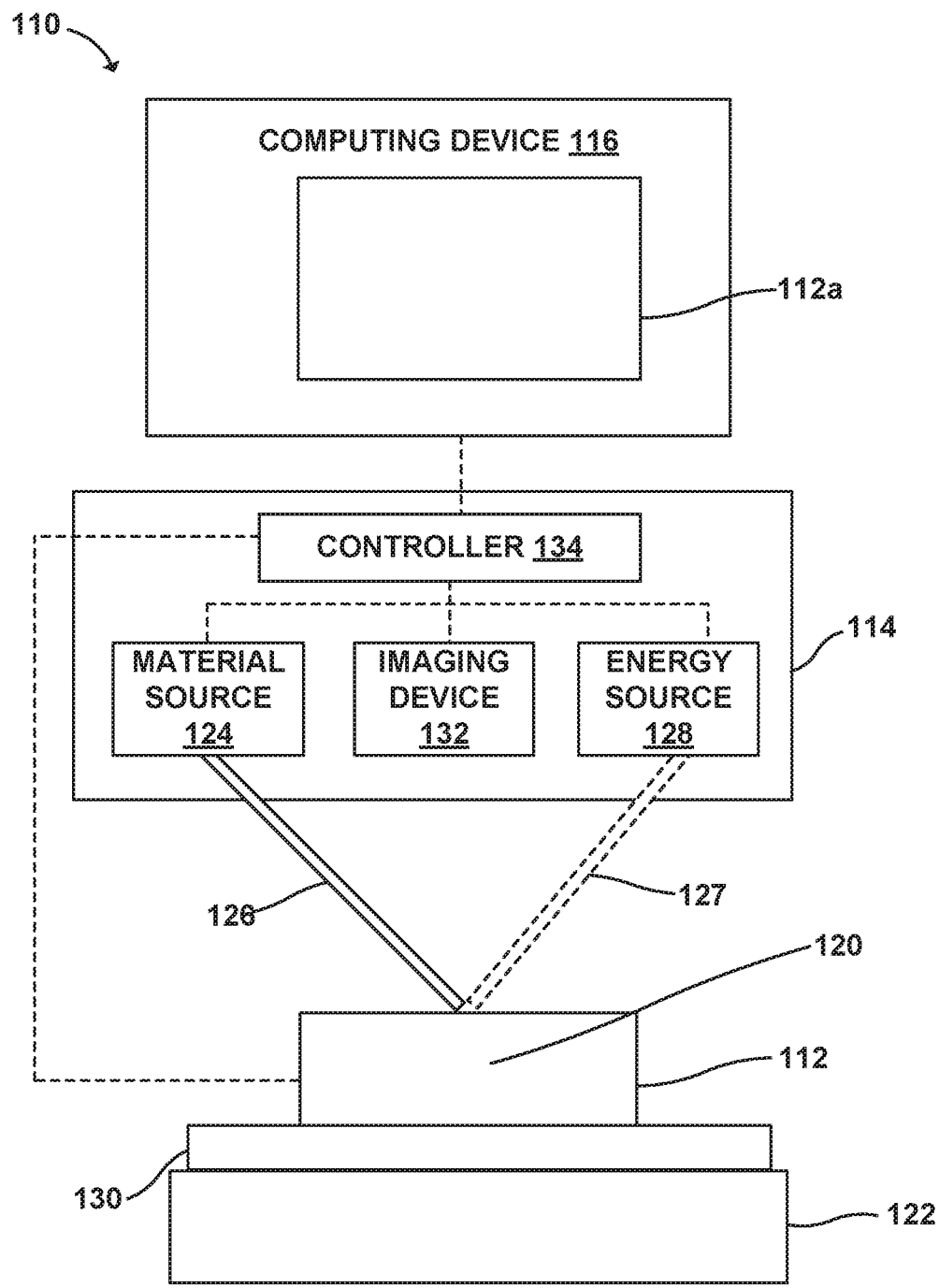
FIG. 6 is a schematic and conceptual block diagram of an example system for fabricating a gas turbine engine component that includes a unitary structure bonded to a substrate.

FIG. 6 is a schematic and conceptual block diagram of an example system 110 for fabricating a gas turbine engine component that includes a unitary structure 112 disposed on a substrate 130. Example system 110 includes a computing device 116 that may control an additive manufacturing tool 114 for fabricating unitary structure 112 that includes a material 120. In some examples, computing device 116 may generate or store a digital representation 112a of unitary structure 112, or of the gas turbine engine component that includes unitary structure 112. In some examples, computing device 116 may control additive manufacturing tool 114 to fabricate the component including unitary structure 112 based on digital representation 112a. In some examples, additive manufacturing tool 114 may include a controller 134 for controlling one or more of a material source 124, and energy source 128, and an imaging device 132.

Computing device 116 may send control signals to controller 134 for controlling additive manufacturing tool 114. For example, computing device 116 may send operational signals to and receive status signals from controller 134 to control and monitor the operation of additive manufacturing tool 114. In some examples, computing device 116 may not control additive manufacturing tool 114, and controller 134 may be configured to receive signals indicative of digital representation 112a from computing device 116 and to control additive manufacturing tool 114 based on digital representation 112a to fabricate the component including unitary structure 112.

In some examples, controller 134 may control material source 124 of additive manufacturing tool 114 to direct a material stream 126 including material 120 at a build location on partially-fabricated component 112, which is carried on a build platform 122, or at an initial build location on a region of substrate 130 on build platform 22. In some examples, material 120 may include metal or alloy, or any suitable material composition discussed above with reference to component 10 or unitary structure 12 of FIG. 1.

Controller 134 also may control energy source 128 to direct an energy beam 127 at the build location. Energy beam 127 may interact with material 120 from material stream 126 at the build location, for example, by fusing, melting, sintering, curing, solidifying or otherwise modifying material 120 at the build location to cause material 120 to be joined to other material of component 112 at the build location, or to material of substrate 130. Energy beam 127 may include any energy, for example, ultraviolet light, electron beam, plasma, or laser, that may interact with material 120 to change a state of material 120. For example, energy beam 127 may be focusable or directable towards material 120 in material stream 126. In some examples, the build location at which energy beam 127 interacts with material stream 126 is adjacent an existing surface of unitary structure 112 such that material 120 is added to unitary structure 112. In some examples, controller 134 may control energy source 128 to emit a diffuse energy beam, or a patterned array of beams, for example, a light pattern. The build location may change as unitary structure 112 is fabricated, for example, along regions or surfaces of partly fabricated unitary structure 112. In some examples, controller 134 may cause additive manufacturing tool 114 to fabricate unitary structure 112 by depositing material 120 at different build locations along a tool path, so that material 120 is ultimately deposited along a predetermined build direction, for example a vertical build direction upwards (for example, against a gravitational force) or downwards (for example, toward a gravitational force).

In some examples, build platform 122 may remain stationary as unitary structure 112 is fabricated. In other examples, build platform 122 may be movable or rotatable, for example, along multiple axis, and controller 134 may control the position of build platform 122. In some examples, controller 134 may successively move build platform 122 against the build direction, or to change the build location by changing the orientation of build platform 122, and that of unitary structure 112, relative to material stream 126 and energy beam 127.

In some examples, controller 134 may separately control material source 124 and energy source 128, for example, by separately controlling material source 124 to direct material stream 126 to deposit a layer or volume of material 120, and then controlling energy source 128 to direct energy beam 127 along a series of build locations within the deposited layer or volume of material 120 to energize material 120 at the build locations to fabricate unitary structure 112. Therefore, controller 134 may direct build location along a two-dimensional or three-dimensional tool path to fabricate unitary structure 112 based on digital representation 112a.

In some examples, controller 134 may control imaging device 132 to image surfaces or regions or volumes of one or more of unitary structure 112, the build location, or platform 122 to generate respective build images periodically or continuously. Controller 134 may periodically or continuously compare the build images with the digital representation 112a to verify that unitary structure 112 substantially conforms (e.g., conforms or nearly conforms) to digital representation 112a. In some examples, controller 134 may control one or more of material source 124, energy source 128, and build platform 122 based on the build images and the digital representation 112a. For example, controller 134 may be configured to control build platform 122 and material source 124, energy source 128, and/or imaging device 132 to translate and/or rotate along at least one axis to position unitary structure 112 relative to material stream 126, energy beam 127, and/or imaging device 132. Positioning unitary structure 112 relative to material stream 126, energy beam 127, and/or imaging device 132 may include positioning a predetermined surface (e.g., a surface to which material is to be added) of unitary structure 112 in a predetermined orientation relative to material source 124, energy source 128, and/or imaging device 132, so that material is added in regions or volumes defined by digital representation 112a.

In some examples, additive manufacturing tool 114 may not include controller 134, and computing device 112 may control one or more of material source 124, energy source 128, imaging device 132, and build platform 122, instead of controller 134.

Example system 110 discussed above may be used to fabricate example components described above with reference to FIGS. 1-5. However, example system 110 may be used to fabricate other example components according to the disclosure.

Figure 7:
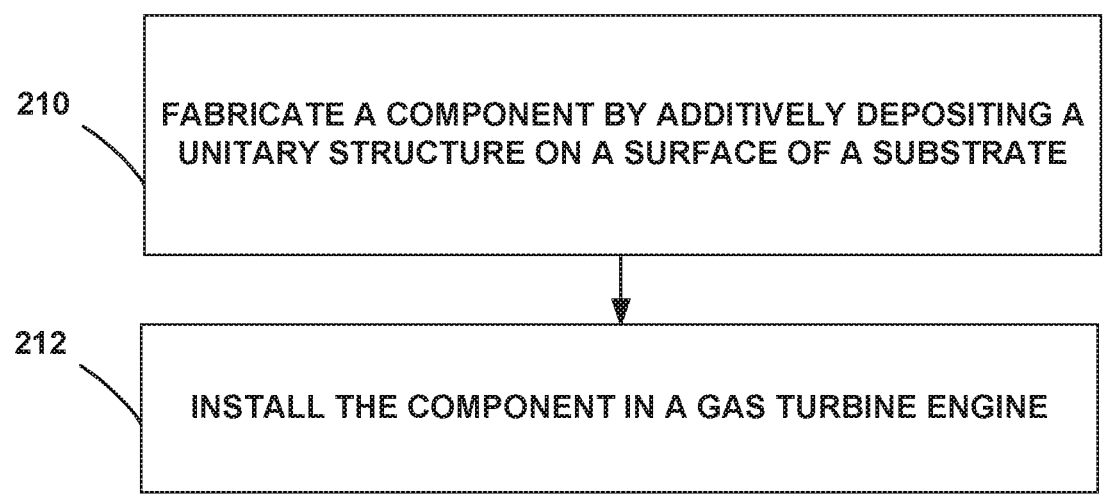
FIG. 7 is a conceptual flow chart of an example technique for fabricating a gas turbine engine component that includes a unitary structure bonded to a substrate.

FIG. 7 is a flow diagram illustrating an example technique for forming a component of a gas turbine engine that includes a unitary structure including a cover layer and a cooling region. While the below technique of FIG. 7 is described with respect to components 10 and 10b of FIGS. 1 and 2, and system 110 of FIG. 6, it will be understood from the context of the specification that the technique of FIG. 7 may be implemented using other systems, or applied to other components of a gas turbine engine including, for example, components 50, 70, and 90, flame tubes, combustor rings, combustion chambers, casings of combustion chambers, turbine blades, turbine vanes, or the like; all of which are envisioned within the scope of the technique of FIG. 7.

The example technique of FIG. 7 includes fabricating component 10 by additively depositing a unitary structure 12 on a surface of a substrate 30 (210). As discussed with reference to FIG. 1 above, unitary structure 12 includes cooling region 22 opposing cover layer 18. Cooling region 22 is disposed between cover layer 18 and substrate 30. Component 10 is configured to separate cooling air plenum 14 from heated gas environment 16. Cover layer 18 defines a hot wall surface 20 configured to face heated gas environment 16. Cooling region 22 defines the plurality of support structures 24 extending between cover layer 18 and surface 31 of substrate 30. Cooling region 22 defines bond surface 32 bonded to substrate 30.

In some examples, additively depositing the unitary structure includes directing material stream 126 and energy stream 127 at a focal region on a surface of substrate 122, or on a surface of partially fabricated unitary structure 112. In some examples, additively depositing the unitary structure includes moving the focal region along a predetermined path. For example, controller 134 may control energy beam 127 and material stream 126 such that energy beam 127 interacts with portions, volumes, or packets of material from material stream 126, for example, by fusing, solidifying, or sintering material from material stream 126 at a series of focal regions along the tool path, to deposit volumes of material along the tool path. In some examples, controller 134 may deposit successive layers of material that ultimately form unitary structure 12. For example, controller 134 may direct material stream 126 and energy beam 127 to deposit material in layers, forming the plurality of support structures 24 defining the plurality of cooling channels 26 in cooling region 22.

In some examples, controller 134 may direct deposition of material on surface 31 of substrate 30 in a predetermined build direction, for example, a vertical direction pointing away from surface 31. Thus, controller 134 may direct material along the build direction, beginning with layers of material on or adjacent surface 31 and then continuing to deposit layers that are successively farther away from surface 31. For example, controller 134 may first direct material stream 126 and energy beam 127 to deposit layers of material forming the plurality of support structures 24, and then continue depositing material along the tool path forming layers of material supported by the plurality of supporting structures 24, that eventually form cover layer 18.

In some examples, digital representation 112a may include a representation of plurality of cooling apertures 34. Controller 134 may direct material stream 126 and laser beam 128 around regions defining cooling apertures 34, for example, by depositing layers that define successive cross-sections of predetermined channels that eventually define cooling apertures 34. Thus, in some examples, system 110 may fabricate cover layer 18 that defines plurality of cooling apertures 34. In some examples, cover layer 18 may be fabricated without cooling apertures 34, and cooling apertures may be formed after the additive manufacturing, for example, by machining or drilling apertures through cover layer 18.

Thus, example techniques may include additive manufacturing to form cover layer 18 that is integrated, continuous, or otherwise unitary with cooling region 22.

Once formed, component 10 may be installed in a gas turbine engine (212) and connected to the air cooling system of the engine. In some examples, installing the unitary structure includes bonding the component to a gas turbine engine component surface. In some examples, bonding the component includes diffusion bonding. In some examples, installing the unitary structure includes connecting the component to an air-cooling system of the gas turbine engine.

While the example technique of FIG. 7 may be used to fabricate example components described above with reference to FIGS. 1-5 and with reference to example system 110 of FIG. 6, the example technique of FIG. 7 may be used to fabricate other example components.

Various examples have been described. These and other examples are within the scope of the following claims.

What is claimed is:

1. A method of fabricating a dual walled component configured to separate a cooling air plenum from a heated gas environment, the method comprising:

additively depositing a material to form a unitary structure on a surface of a substrate, wherein the substrate defines a cold wall surface configured to face the cooling air plenum, wherein the unitary structure comprises a cooling region and a cover layer, wherein the cover layer defines a hot wall surface configured to face the heated gas environment, wherein the cooling region is disposed between the cover layer and the substrate and comprises a plurality of support structures extending between the cover layer and the surface of the substrate, and wherein at least some of the support structures of the plurality of support structures define a respective bond surface bonded to the substrate at the surface of the substrate, wherein the bond surface inhibits transfer of heat across the bond surface from the unitary structure to the substrate.

2. The method of claim 1, wherein the plurality of support structures defines a plurality of cooling channels, respective cooling channels of the plurality of cooling channels being between adjacent support structures of the plurality of support structures.

3. The method of claim 2, wherein the hot wall surface defines a plurality of cooling apertures, wherein respective cooling apertures of the plurality of cooling apertures are fluidly connected to respective cooling channels of the plurality of cooling channels for fluidly connecting the heated gas environment to the cooling region.

4. The method of claim 3, wherein the substrate defines a plurality of impingement apertures that extend through a thickness of the substrate, wherein the plurality of support structures comprises a plurality of pedestals that connect the substrate to the cover layer to define a plurality of cooling channels between the substrate and the cover layer, and wherein the plurality of impingement apertures, the plurality of cooling channels, and the plurality of cooling apertures fluidly connect the cooling air plenum to the heated gas environment.

5. The method of claim 3, wherein the plurality of cooling apertures defines an angle of incidence to the hot wall surface that is between about 10 degrees and about 75 degrees.

6. The method of claim 1, further comprising installing the dual walled component in a gas turbine engine.

7. The method of claim 6, wherein installing the dual walled component comprises bonding the dual walled component to a gas turbine engine surface.

8. The method of claim 7, wherein the bonding comprises diffusion bonding.

9. The method of claim 6, wherein the installing the dual walled component comprises connecting the dual walled component to an air-cooling system of the gas turbine engine.

10. The method of claim 1, wherein the dual walled component comprises a flame tube, a combustion ring, a combustor casing, a combustor guide vane, a turbine vane, a turbine disc, or a turbine blade.

11. The method of claim 1, wherein additively depositing the material to form the unitary structure comprises:
directing a material stream and an energy stream at a focal region on the surface of the substrate, and
moving the focal region along a predetermined path.

12. The method of claim 11, wherein the energy beam comprises a laser beam and wherein the material stream comprises one or more of metal or alloy powder, wire, or ribbon.

13. The method of claim 11, wherein the unitary structure is additively deposited by depositing successive layers that define successive cross-sections of predetermined channels to form a plurality of cooling apertures fluidly connected to the plurality of support structures, wherein respective cooling apertures of the plurality of cooling apertures are fluidly connected to respective cooling channels of the plurality of cooling channels for fluidly connecting the heated gas environment to the cooling region.

14. The method of claim 1, wherein the unitary structure comprises a turbine vane defining an exterior surface comprising the hot wall surface and defining an internal hollow chamber comprising the cooling air plenum, wherein the cover layer comprises a coversheet, and wherein the substrate comprises a spar.

15. The method of claim 14, wherein the hot wall surface defines a plurality of cooling apertures, wherein respective cooling apertures of the plurality of cooling apertures are fluidly connected to respective cooling channels of the plurality of cooling channels for fluidly connecting the heated gas environment to the cooling region, and wherein the plurality of cooling apertures are positioned along a leading edge of the turbine vane.

16. The method of claim 1, wherein the unitary component comprises a combustor component configured to separate the cooling air plenum from a combustion chamber comprising the heated gas environment.

17. The method of claim 1, further comprising, before depositing the unitary structure on the surface of the substrate, depositing a filler composition on the surface of the substrate in a predetermined pattern that defines a plurality of cooling channels between the plurality of support structures.

18. The method of claim 17, further comprising removing the filler composition from the plurality of cooling channels by subjecting the filler composition to at least one of a thermal treatment, a leaching composition, or an oxidizing environment.

19. The method of claim 1, wherein the dual walled component comprises a gas turbine engine component.

* * * * *